Nov. 26, 1935.  W. C. OSTERHOLM  2,021,921

CLUTCH

Filed Oct. 22, 1931

INVENTOR
William C. Osterholm.
BY
ATTORNEYS

Patented Nov. 26, 1935

2,021,921

UNITED STATES PATENT OFFICE 2,021,921

CLUTCH

William C. Osterholm, Oak Park, Ill.

Application October 22, 1931, Serial No. 570,405

14 Claims. (Cl. 192—41)

The invention relates to clutches and it has particular relation to a clutch of the one-way type, wherein for example, a driving member rotates a driven member in one direction but is capable of freely rotating in the other direction without imparting rotary movement to the driven member.

In certain respects, the invention constitutes an improvement over the inventions embodied in my co-pending applications for patent relating to clutches of the above designated character identified by Serial Numbers 522,943 and 536,216, filed respectively on March 16, 1931, and May 9, 1931.

The principal objects of the present invention are to provide an improved clutch of the above designated character in which a series of blades, disposed between the driving and driven members for wedging engagement therewith, are rockably supported on one of the members in an improved and highly efficient manner; to provide in a clutch of this character, improved means for maintaining the blades on the member rockably supporting them, without interfering with rocking movement of the blades; to provide an improved clutch in which the parts can be manufactured inexpensively and assembled and disassembled readily; to provide a clutch of the above designated character, in which means are employed for quickly throwing the blades into and out of their operative wedging positions, thereby avoiding wear on the parts that would result from a more gradual movement of the blades into and out of their wedging positions; and, in general, to provide a clutch of the one-way type which operates in a highly efficient manner for the purposes specified, which will last indefinitely, and which is so constructed that any parts of the clutch can readily be replaced if this should ever be found necessary.

In general also, the present invention has objects such as those stated in the above mentioned co-pending applications, and it is to be understood that the objects of this invention are to provide a clutch which will operate in general like the clutches disclosed in said co-pending applications, while additionally providing improvements.

For a better understanding of the invention, reference may be had to the accompanying drawing forming a part of the specification, wherein.

Figure 1:
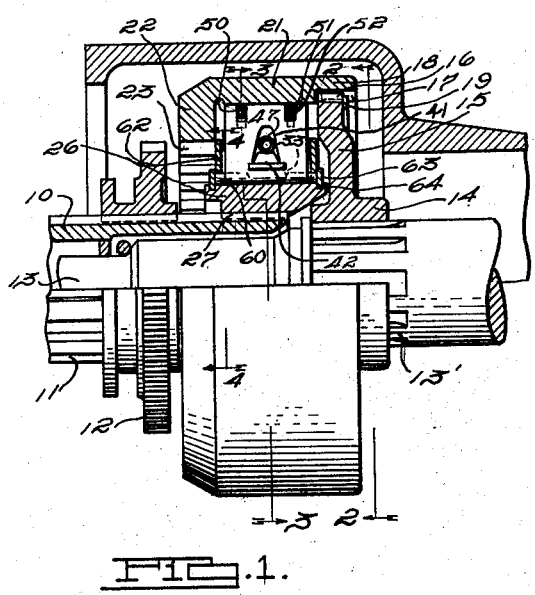
Figure 1 is a fragmentary, longitudinal cross sectional view of a one-way clutch constructed according to one form of the invention.
Figure 2:
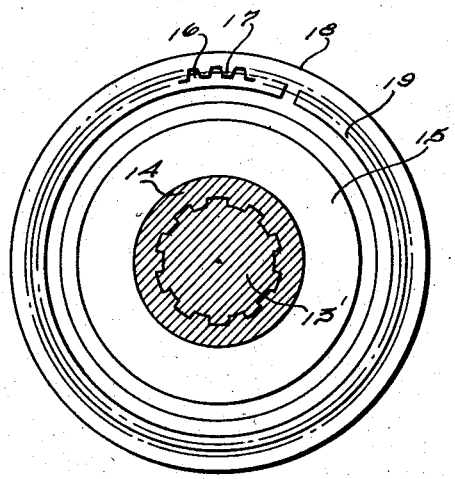
Fig. 2 is a cross sectional view taken substantially along the line 2—2 of Fig. 1.

Referring to Figs. 1 and 2, a tubular shaft 10 is illustrated, which has axially extending teeth 11 on its outer periphery, for splining a pinion 12 thereon in such manner that the pinion is driven by the shaft but is longitudinally movable thereon. This shaft houses a second and solid shaft 13 projecting beyond the end of the first mentioned shaft, which is provided with teeth 13' on the outer periphery of the projecting end portion, serving to lock a hub member 14 thereon in driving relation thereto. Normally the hub member 14 is so mounted on shaft 13 that it will not move longitudinally thereon but is merely locked to the shaft in driving relation thereto. The hub member 14 has an outwardly directed annular flange 15 which is provided on its outer peripheral edge with teeth 16 intermeshing with teeth 17 formed at one end of a casing member 18 extending around both shafts in concentric relation thereto. A split locking ring 19 seated in a groove formed in the teeth 17 in the casing member, adjacent the end thereof and outwardly of the flange 15, locks the flange and hub 14 not only in driving relation but against relative, axial movement. The casing member 18 has a cylindrical portion 21 and at the end of the latter opposite that end having the teeth 17 is provided with an inwardly directed portion 22 having teeth on its inner periphery indicated at 23 adapted to mesh with the teeth on pinion 12 when the latter is moved axially of shaft 10. The shaft 13 is suitably supported in bearings in shaft 10 for rotation with respect to the latter and this manner of mounting the shaft may be effected in any well known manner. It is apparent that shaft 13 has driving engagement with the hub 14 and hence the casing 18 while the pinion 12 has driving engagement with shaft 10, and in the event the pinion 12 is moved into meshing relation with the teeth 23 on the casing, it is apparent that the shafts will be positively locked together and upon rotating either shaft in either direction, corresponding and simultaneous movement of the other shaft will occur.

Within the casing 18, a hub member 26 is mounted on the end of shaft 10, and teeth 27 on the hub member engaging the teeth 11 on the shaft drivingly lock these members together. This locking engagement between the hub member 26 and shaft 10 is such that axial movement of the hub member normally will not be permitted and hence the parts will be positively connected against axial displacement. The present invention relates particularly to means for providing a one-way clutch driving engagement between the hub member 26 and the casing 18 and particularly with the inner peripheral surface of the cylindrical portion 21 of such casing. If the pinion 12 is in mesh with the teeth 23 on the casing it is apparent that this one-way clutch would not function and hence its operation may be prevented and both shafts positively connected in driving relation in either direction. If the pinion 12 is not in mesh with the teeth 23 on the casing, the one-way clutch will serve to connect shaft 10 with shaft 13 for driving purposes only in one direction.

Figure 3:
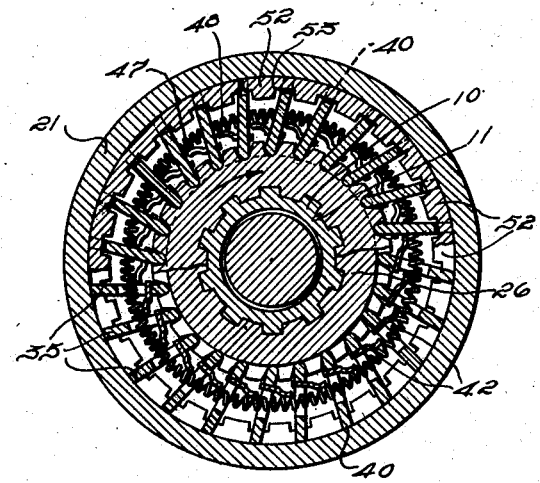
Fig. 3 is a cross sectional view taken substantially along the line 3—3 of Fig. 1.
Figure 4:
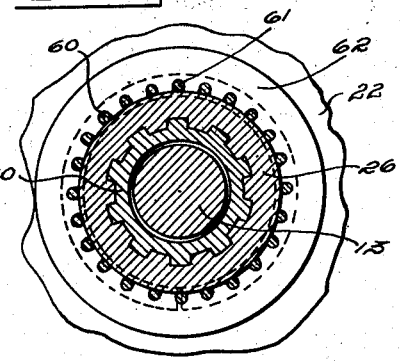
Fig. 4 is a cross sectional view taken substantially along the line 4—4 of Fig. 1.
Figure 5:
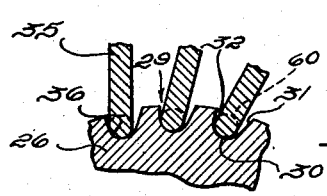
Fig. 5 is a detail, cross sectional view illustrating the manner in which the blades of the clutch are rockably supported on one of the rotary members.

Now as best shown by Figs. 3 and 5, the hub member 26, has a series of circumferentially spaced, axially extending grooves 29 formed in its outer peripheral surface, and each of these grooves is defined by an arcuate base 30 and side walls 31 and 32 directed substantially tangentially to the arcuate base. The side wall 31 is directed approximately at an angle of twenty degrees to a radius extending from the axis of the hub member to the axis of the arcuate base of the groove, while the side wall 32 preferably is directed substantially parallel to the radius. Centrally of the ends of the hub member 26, the outer periphery of the hub member is formed with a circumferentially extending recess 33 substantially equal in depth to the grooves 29 and the purpose of this recess will presently be set forth.

Located between the hub member and the inner peripheral surface of the cylindrical portion 21 of the casing 18, a plurality of blades 35 are provided, each of which is biased toward a radial position with respect to the axis of the hub member and casing. In other words, each blade is longer than the radial distance between the base of one of the grooves 29, and the inner peripheral surface of the cylindrical portion 21. The inner edge of each blade has an arcuate contour as indicated at 36 and seats upon the arcuate base 30 of a groove 29 but the radius of curvature of the base 30 of the groove is slightly larger than the radius of curvature of the curved edge 36 of the blade and consequently the edge of the blade will have substantially only line contact with the base of the groove. This facilitates rocking movement of the blade in the groove. It will be apparent that the blade can only have rocking movement within the limits defined by the side walls 31 and 32 and that if it should engage the side wall 32, it will be disposed substantially radially of the hub member. Normally the blade is of such length, that it will be located between the side walls 31 and 32 of the groove 29, at an angle of about fifteen degrees to the side wall 32 and hence be displaced fifteen degrees from said side wall, and five degrees from the side wall 31. Hence, before the blade could engage the side wall 32, it would have to move through an angle of approximately fifteen degrees.

It will be noted that the inner edge face of each of the blades is curved about an axis extending linearly to the edge, and that the trunnions projecting from the ends of the blades have an axis of curvature substantially coinciding with said linearly extending axis. It follows that during pivotal movement of the blade in the groove, the trunnions only turn about the axis of pivotal movement.

The radially outer edge of each blade is slightly inclined as indicated at 40 in Fig. 3, and normally is biased into engagement with the inner peripheral surface of the cylindrical portion 21 of the casing. Considering the hub member 26 as the driving member, the side wall 31 of the groove 29 therein, will be located at the advance side of the groove, and the blades being biased and located at an angle of about fifteen degrees with respect to the respective side walls 32 of the grooves, it is apparent that if the outer edges of the blades wear, they still may contact with the inner peripheral surface of the cylindrical portion 21 of the casing, by moving oppositely to the direction of rotation of the hub member 26 until substantially abutting the side wall 32 of the grooves and hence disposed in substantially radial positions with respect to the hub member.

Figure 6:
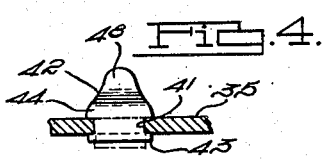
Fig. 6 is a detail view illustrating the manner in which a lip is associated with each of the blades.

For normally urging the blades against the inner peripheral surface of the cylindrical portion 21 of the casing, means are provided which will now be described. Each blade as best shown by Figs. 1 and 6, is provided centrally thereof with a triangular opening 41 having an inner base extending axially of the hub member and spaced from the axes of rocking movement of the blade. Such recesses may be formed by punching each of the blades by means of suitable machinery for this purpose. Each recess 41 is adapted to receive a lip 42 formed from thinner metal, which is locked to the blade by inserting one end of the lip through the base of the recess 41, and then swaging a projecting portion of the lip extending beyond the recess, laterally as indicated at 43 over sides of the blade at opposite sides of the recess. Projections 44 on the lip at the opposite side of the blade in conjunction with the swaged over end portions of the lip firmly maintain the lip in position. It is, of course, to be understood that the lip may be secured to the blade by welding or by any other suitable means as long as a rigid construction is provided. Each of the lips 42, as clearly snown by Fig. 3, projects away from the blade toward the lag side thereof if the hub member 26 be considered as the driving member, a considerable distance and to a point near the adjacent blade. In this respect it is desired to call attention to the fact that the recess 41 radially outward of the lip 42 is adapted to receive the lip of the blade at the advance side thereof, considering the hub member 26 as the driving member, and this feature of having the lips capable of projecting into the recesses 41 in adjacent blades, permits closer nesting of the latter, the employment of more blades and hence greater contact area between the blade driving surfaces and the casing 18.

The remote end of each lip is so positioned that a radius extending from the axis of the hub member to the end portion of the lip, is disposed at the lag side of the groove 29 in the hub member 26, when considering the hub member as the driving member. Now for urging the blades toward engaging positions with respect to the casing 21, a helical spring ring 47 extending circumferentially through the recesses 41 outwardly of the lips 42, is so constructed that it inherently tends to contract and engage the remote ends of the lips. In this connection it is desired to call attention to the fact that the ends of the lips are outwardly deflected and of arcuate contour as indicated at 48, to provide a substantial point contact between the lips and the spring. This point contact, as mentioned previously, is disposed at the lag side of the groove, and hence the spring through the lip tends to bias the blades into engaging relation with the casing.

It will be noted that the lips 42 preferably are located near the hub member 26, as shown by Fig. 1, although their positions may be varied as found most desirable. As located in Fig. 1, the lips are directly outward of the circumferentially extending recess 33 in the hub member, and this arrangement permits movement of the blades without interference by engagement of the lips with the hub member, because the recess 33 will permit movement of the lips thereinto as the blades are rocked about their pivotal points.

For also governing action of the blades, each blade, as shown by Figs. 1 and 3, has a pair of axially spaced slots 50 and 51 formed in its outer edge portion, which open to the outer edge of the blade and hence to the region adjacent the cylindrical portion 21 of the casing. The slots at each side of the blades, are respectively circumferentially aligned, and each group of slots receives a split ring 52 having slots 53 formed in its inner periphery in circumferentially spaced relation, each of which receives one of the blades. These slots are of such circumferential length, that limited biasing movement of the blades by the spring 47 is permitted with respect to the rings. Also, the width of the slots is such that slight axial movement of the rings 52 is permitted to prevent binding and to permit free movement of the rings with respect to the blades. Normally the rings 52 tend to expand against the cylindrical portion 21 of the casing, or rather the inner peripheral surface of such portion of the casing, and hence when the rings are disposed within the casing, they tend to maintain frictional contact with such peripheral surface although this frictional contact is not sufficient to cause a binding engagement that would unduly prevent movement of the rings. The action of each of the rings 52 may be compared in a sense to that of the split piston rings in internal combustion engines.

For the purpose of positively maintaining the blades on the hub 26, each of such blades at opposite sides adjacent the edge seating in a groove in the hub member, has a trunnion 60 of cylindrical shape, the axis of which is substantially aligned with the axis of curvature of the curved edge 36 on the blade. Hence, normally during movement of the blade, the trunnions will not be displaced but merely turned about their axes. These trunnions rotatably project into curved recesses 61 formed in the inner peripheral edge of a ring 62 disposed around each end of the hub member beyond the ends of the blades. The recesses 61 are such that the trunnions may rotate freely therein but bodily movement of the blades away from the bases of the grooves is substantially prevented. For maintaining the ring 62 in position, a split lock ring 63 is mounted in a groove 64 at each end of the hub member 26.

While a closed housing has not been illustrated in the drawing, in actual practice it will be understood that the clutch parts are mounted in a closed housing, a part of which is indicated. This housing preferably will be filled with lubricant and hence lubricant will fill or substantially fill the casing 18 and hence will be disposed between the respective blades. Of course, it is to be understood that a lubricant in the casing 18 is not absolutely necessary but, as set forth in my co-pending application Serial No. 536,216, the presence of a lubricant around the blades has a particular and desirable purpose in that during rotation of the shafts or one of them, the momentum or inertia of the lubricant as the case may be assists in moving the blades.

In assembling the clutch, it will be understood that the pinion 12 will first be mounted on the shaft 10. The blades 35 then may be disposed with their inner edges in the grooves in the hub 26, and the locking rings for holding the blades on the hub properly located. The spring 47 of course will be trained through the recesses 41 prior to mounting the blades on the hub and then the rings 52 can be disposed in the slots 50 and 51 in the outer edges of the blades. Then it is only necessary to slightly contract the rings and bias the blades, and the blades and rings can then be slipped into the casing 18. After the casing 18 and clutch elements therein are disposed on the shaft 10, the hub member 14 may be mounted on the shaft 13 and connected to the casing 18 in the manner described or else it may first be connected to the casing and then connected to the shaft.

During operation of the clutch, assuming that the hub member 26 on the shaft 10 constitutes the driving member, it is apparent that clockwise rotation of the hub member as seen by Fig. 3, tends to cause a binding or wedging engagement of the blades between the casing 18 and the hub member. The spring 47, of course, assists in biasing the blades into their operative positions as described, and constantly tends to maintain them in such positions. If during rotation of the two shafts by means of the clutch, the shaft 13 should rotate more rapidly than the shaft 10, it is apparent that the casing 18 can slip over the rings 52 and the outer edges of the blades, and during such relative rotation, bias the blades slightly to prevent any undesirable binding engagement. The rings 52 operatively connect the outer edges of the blades, although permitting movement of any blades relative to the rings a certain amount, and facilitates simultaneous action of the blades as well as accelerate the movement thereof. The frictional engagement between the rings and the casing 18 causes movement of the rings with respect to the blades and when such movement has reached the amount limited before the rings positively engage the blades, the blades automatically will be quickly moved by the rings into their operative positions. If the hub member 26 be considered as the driving member as mentioned, upon the initial movement of the hub member, the rings 52 of course will tend to stay stationary because of their frictional engagement with the casing 18, and since the blades will be carried around by the hub member positively, when the blades engage the advance sides of the slots in the rings, the rings will quickly and forcefully move the blades against the inner surface of the casing. Conversely, should the casing rotate more rapidly than the hub member 26, the frictional contact between the rings and the casing will cause the rings to move the blades quickly into their inoperative positions. In general these rings cause the blades to move into and out of their operative positions quickly, thereby avoiding wear on the ends of the blades that would occur before proper wedging engagement of the blades between the casing and hub member could be secured, if quick movement of the blades was not obtained. In this connection it is desired to call attention to the fact that the grooves in the hub member 26 limit movement of the blades in either direction and hence the rings 52 cannot cause an undesired movement of the blades.

Preferably all the parts of the clutch are constructed of metal or at least the parts subjected to wear are constructed of metal, and the bearing portions hardened to withstand wear.

Although only one form of the invention has been described and illustrated in detail, it will be apparent to those skilled in the art that various modifications may be made without departing from the scope of the appended claims.

I claim:

1. A one-way clutch for connecting rotary shafts comprising inner and outer radially spaced members on the shafts respectively, movable elements connected to one member and capable of binding engagement with the other member, and a split, inherently expansible ring connecting the elements and frictionally engaging one of said members.

2. A one-way clutch for connecting rotary shafts comprising inner and outer radially spaced members on the shafts respectively, circumferentially spaced elements rockably mounted on one member and of such dimensions as to be capable of binding engagement with the other member, and a split, inherently expansible ring frictionally engaging the said other member, for moving the elements.

3. A one-way clutch for connecting rotary shafts comprising inner and outer radially spaced members, on the shafts respectively, tiltable blades rockably mounted on one member and of such length as to be capable of binding engagement with the other member, and a split, inherently expansible ring connecting the blades and frictionally engaging the said other member, for moving the blades.

4. A one-way clutch for connecting rotary shafts comprising inner and outer radially spaced members, on the shafts respectively, tiltable blades rockably mounted on one member and of such length as to be capable of binding engagement with the other member, and a deformable ring connecting the blades and frictionally engaging one of said members.

5. A one-way clutch for connecting rotary shafts comprising inner and outer radially spaced members, on the shafts respectively, tiltable blades rockably mounted on one member and of such length as to be capable of binding engagement with the other member, and a deformable ring connecting the blades and frictionally engaging one of said members, said ring cooperating with openings in the blades.

6. A one-way clutch for connecting rotary shafts comprising inner and outer radially spaced members on the shafts respectively, tiltable blades rockably mounted on one member and of such length as to be capable of binding engagement with the other member, and a split, inherently expansible ring frictionally engaging said other member and connected to the blades for limited circumferential movement with respect thereto.

7. A one way clutch for connecting rotary shafts comprising inner and outer radially spaced members on the shafts respectively, elements between the members and adapted to be pivotally biased into engagement with both members, means for constantly urging the elements into such engaging positions, and means for insuring simultaneous pivotal movement of all the elements, said means comprising an annular ring interconnecting the elements and having frictional contact with one member.

8. A one way clutch, comprising a pair of shafts, inner and outer radially spaced members on the shafts respectively, blade elements between the members and adapted to be pivotally biased into direct and wedging engagement with said members, means pivotally mounting one end of each element on one of the members so that such ends of all of the elements will be pivoted at circumferentially separated but fixed points on said member, means constantly urging the elements into wedging relation with both members, and means for insuring simultaneous pivotal movement of all the elements.

9. A one way clutch, comprising a pair of shafts, inner and outer radially spaced members mounted on the shafts respectively, one of such members having its peripheral surfaces adjacent to the other member, smooth and uninterrupted in a circumferential direction, blade elements fulcrumed on the other member at permanently fixed points and adapted to be biased toward radial positions and into direct and wedging engagement with such peripheral surface, and means positively connecting the blade elements to insure positive and simultaneous pivotal action of all elements.

10. A one way clutch comprising a pair of shafts, inner and outer radially spaced members on the shafts respectively, one of such members having its peripheral surface adjacent the other member, smooth and uninterrupted in a circumferential direction, blade elements fulcrumed on the other member at circumferentially separated but fixed points and being adapted to be biased toward radial positions and into direct and wedging engagement with said peripheral surface, and means positively connecting the blade elements to insure positive and simultaneous pivotal action of all elements and comprising a ring extending around the elements and having circumferentially interlocking engagement therewith, so that the ring and blade elements move together.

11. A one way clutch, comprising a pair of shafts, inner and outer radially spaced members on the shafts respectively, one of such members having its peripheral surface adjacent the other member, smooth and uninterrupted in a circumferential direction, blade elements fulcrumed on the other member at circumferentially separated but fixed points and being adapted to be biased toward radial positions and into direct and wedging engagement with said peripheral surface, means positively connecting the blade elements to insure positive and simultaneous pivotal action of all elements and comprising a ring extending around the elements and having circumferentially interlocking engagement therewith, so that the ring and blade elements move together, and means constantly urging the blade elements into wedging relation with the members.

12. A one way clutch comprising a pair of shafts, inner and outer radially spaced members on the shafts respectively, the inner member being provided with axially directed and circumferentially separated grooves, and the outer member having a smooth and uninterrupted peripheral surface, blade elements between the members and having their inner ends pivotally mounted in the grooves, means constantly urging the blade elements toward radial positions and into direct and wedging contact with the outer member, means releasably mounted on one of the shaft members for positively maintaining the inner edges of the blades within the grooves, and means insuring simultaneous pivotal movement of all the blade elements.

13. A one way clutch, comprising a pair of shafts, inner and outer radially spaced members on the shafts respectively, the inner member being provided with axially directed and circumferentially spaced grooves, and the outer member having a smooth and uninterrupted peripheral surface, blade elements between the members and having inner ends pivotally mounted in the grooves, trunnions projecting from axially opposed sides of each blade element at its inner end, means constantly urging the blade elements toward radial positions and into wedging contact with the outer member, means releasably mounted on one of the members and engaging said trunnions for positively maintaining the inner edges of the blade elements within the grooves, and means insuring simultaneous pivotal movement of all blade elements.

14. A one way clutch, comprising a pair of shafts, inner and outer radially spaced members on the shafts respectively, the inner member being provided with axially directed and circumferentially spaced grooves, and the outer member having a smooth and uninterrupted peripheral surface, blade elements between the members and having inner ends pivotally mounted in the grooves, trunnions projecting from axially opposed sides of each blade element at its inner end, means constantly urging the blade elements toward radial positions and into wedging contact with the outer member, and means releasably mounted on one of the members and engaging said trunnions for positively maintaining the inner edges of the blade elements within the grooves.

WILLIAM C. OSTERHOLM.